US005880478A

United States Patent [19]

Bishop et al.

[11] Patent Number: 5,880,478

[45] Date of Patent: Mar. 9, 1999

[54] COMPOUND REFRACTIVE LENSES FOR LOW ENERGY NEUTRONS

[75] Inventors: David John Bishop, Summit; Peter Ledel Gammel, Millburn; Eric D Isaacs; Philip Moss Platzman, both of Short Hills, all of N.J.

[73] Assignee: Lucent Technologies Inc., Murray Hill, N.J.

[21] Appl. No.: 859,781

[22] Filed: May 19, 1997

[51] Int. Cl.$^{6}$ .................... G01N 23/00

[52] U.S. Cl. .................... 250/505.1; 250/251

[58] Field of Search .................... 250/251, 505.1; 378/145

[56] References Cited

U.S. PATENT DOCUMENTS

| | | | |
|---|---|---|---|
| 5,016,267 | 5/1991 | Wilkins | 250/370.05 |
| 5,028,789 | 7/1991 | Whittemore | 250/505.1 |
| 5,167,912 | 12/1992 | Wood | 376/458 |
| 5,497,008 | 3/1996 | Kumakhov | 250/505.1 |
| 5,658,233 | 8/1997 | Peurrung | 250/251 |

*Primary Examiner*—Bruce Anderson

[57] ABSTRACT

The specification describes a refractive lens for focusing cold neutrons. It comprises a plurality of concave lens elements made from materials with low neutron absorption.

19 Claims, 1 Drawing Sheet

COMPOUND REFRACTIVE LENSES FOR LOW ENERGY NEUTRONS

FIELD OF THE INVENTION

The field of this invention is neutron beam apparatus and more specifically optics useful for focusing or collimating neutron beams.

BACKGROUND OF THE INVENTION

Cold, long wavelength, neutron sources are useful in a variety of analytical, commercial, and medical applications. Cold neutron sources, frequently referred to as cold neutron (CN) sources, provide neutrons with velocities of the order of 2200 m/s and less, and wavelengths typically in the 0.2–10 nm spectral range. Cold, long wavelength, neutrons, i.e. 0.2–10 nm, are highly penetrating and useful for bulk applications requiring significant depth of neutron exposure. CN radiation is useful in microscopy, although resolution is inferior to electron and x-ray microscopy. The optical cross section for neutrons in neutron analysis is dominated by atomic nucleii. This is in contrast to electron and x-ray beams that are modulated by electron shell structure. Thus neutron beams see different structural landscapes in microscopy and add a new dimension.

Neutron beam facilities with higher beam intensities are coming on line, and promise a variety of important new and valuable applications. Neutron activation analysis, in which a material sample is exposed to a neutron beam and neutron spin properties detected, is a widely used and important technique for determining composition of matter. With highly focused CN beams microscopic samples, and microscopic regions of samples, can be analyzed. Spatial variations in composition over small areas can be resolved.

In semiconductor device manufacturing, CN sources are useful for non-destructive testing of semiconductor crystal structures for defect analysis and impurity profile analysis. Strain distribution in semiconductor crystals can be revealed by CN analysis and is used in the design and production of semiconductor lasers to predict device lifetime. High intensity and highly focused beams improve both spatial resolution and detection limits in these analyses.

CN beams are useful in medicine for abnormal tissue therapy. High flux beams are desired to reduce exposure time, and highly localized beams are beneficial in reducing radiation exposure of adjacent healthy tissue. In these, and other applications, some yet to be fully realized, the utility of the CN tool is usually in direct proportion to the intensity of the beam, and the control of the beam direction, i.e. the ability to focus CN beams. At the present time, both reactor (continuous) and spallation (pulsed) sources of cold neutrons suffer from very low total fluence. This fact severely limits the usefulness of CN apparatus in most applications.

CN beam lensing elements have been sought for some time both to focus the beam and increase the neutron flux density, and to simplify beam handling, i.e. manipulation and steering. Lensing elements can also be important to modify the angular divergence of a neutron beam in two circumstances. The first is in matching the cold neutron source to guide tubes, in which divergence needs to be matched to the critical angle for total internal reflection. The second is in scattering applications where the beam divergence is an important issue. In this case a lens, similar to an infinity corrected optic, can be used to reduce the beam divergence from a pinhole or other source.

Efforts to focus CN beams have met with only mild success. The best results to date have been with lenses and collimators based on reflective optics. It has been known for some time that neutrons will undergo nearly total reflection from a variety of materials. The critical angle however, is typically very high, leading to beam steering devices based on lightguide approaches. A widely used device of this kind is an array of capillary guides, sometimes referred to as a Kumakhov lens, and supermirror coated guide tubes. The capillaries are typically glass or plastic with the interior of the capillary coated with a neutron reflecting material, e.f. nickel. The individual capillaries are arrayed in a parallel bundle, closely packed to capture as much of the source beam as possible. The source then becomes in actuality a multiple beam source. The capillaries are bent inwardly with respect to the axis of the bundle to focus each of the multiple beams to a common focal point. For more details on these systems see e.g., U.S. Pat. No. 5,497,008, issued Mar. 5, 1996; M. A. Kumakhov and V. A. Sharov, “A neutron lens”, Nature, Vol. 357, 4 Jun., 1992, pp. 390–393,; H. Chen et. al., “Neutron focusing lens using polycapillary fibers, Appl. Phys. Lett. 64 (16), 18 Apr. 1994, pp. 2068–2070; Q. F. Xiao et al, ” Neutron focusing optic for submillimeter materials analysis, Rev. Sci. Instrum. 65 (11), November 1994, pp. 3399–3402.

Neutron optics can also be important to defocus, or magnify, a neutron beam. An example in small neutron scattering is the case when resolution is limited by the fixed (and not optically small) spatial resolution of two-dimensional neutron detectors. A magnifying lens could be used to optimize the spatial variation of the signal in the plane of the detector.

The devices described in the references given above, and other focusing devices based on grazing angle reflection of neutrons, are typically difficult and expensive to make. Moreover, and perhaps more significantly, they are inefficient because a substantial fraction of the already low flux source beam is lost due to the unused space between capillaries. While in an ideal model, with zero wall thickness for the capillaries, and the capillaries arranged in a hexagonal close packed array, the loss due to interstitial space is only 9.3%, when the wall thickness and the thickness of the interior wall reflective coating is considered, with a typical wall thickness equal to at least 20% of the ideal diameter (OD), the interstitial loss approaches 50%. That large loss factor could be eliminated with a refractive optics lens, but to date no such lens exists.

STATEMENT OF THE INVENTION

We have succeeded in producing a cold neutron lens based on refractive optics. The lens is a compound system, employing from 3–300 thin focusing lens elements, to refract and effectively focus a cold neutron beam. By using refraction optics we are able to use known refractive lens design principles and standard design software. The refractive optics lens eliminates the large interstitial loss inherent in the most common reflection lens of the prior art, and while losses due to absorption in the refractive lens are significant, they are substantially less than the losses inherent in other known CN lens devices. These new neutron lenses can be employed in existing CN applications, some of which have been mentioned above. Additionally, they can be used in new forms of neutron microscopes based on refraction principles like those used in the design of optical microscopes.

DETAILED DESCRIPTION

Figure 1:
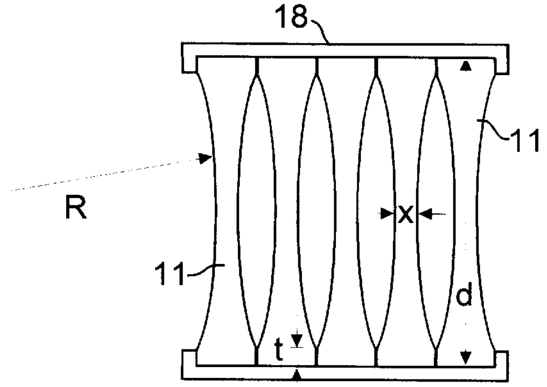
FIG. 1 is a schematic view of a multi-element lens constructed according to the principles of the invention.

To demonstrate the principles of the invention a CN refractive lens system was constructed consisting of a series of thin lenses arranged as shown schematically in FIG. 1. The figure shows 5 concave lens elements 11 in lens holder 18. To first order, the number of lens elements depends on the neutron focal length of each element, the overall focal length desired. The total focal length is f=fo/n, where n is the number of elements in the array and $f_o$ is the focal length of a single lens. Also to be considered in the design is the neutron absorption of each element, so that the combined absorption of n elements is within the acceptable range for the system design. Absorption overall can be held within reasonable limits with proper choice of materials, as taught below.

The neutron index is a property of the nucleus only of the atoms in the material of the lens. Typically materials with a small nucleus, i.e. elements with low atomic weight, are most effective. Isotopes of these elements can also be used.

In FIG. 1 the lens elements are shown as bi-concave but plano-concave elements can also be used. This may simplify processing for some lens materials at the expense of doubling the number of elements for a given focal length. The lens elements are also shown as parabolic but other concave shapes, e.g. spherical, can be used as well. One dimensional focusing can be achieved with cylindrical shapes. The radius R of the lens elements is as small as reasonable, and is preferably in the range 25–50 mm. The thickness of the lens, as measured at the lens axis and shown as dimension X in FIG. 1, is also desirably small to minimize the optical path of the beam through each lens element, and minimize absorption losses. For defocusing, or magnifying neutrons, convex shapes can be used.

For simplicity in illustration, the lens of FIG. 1 is shown with 5 simple concave lens elements. In the system actually used to demonstrate the invention, 30 $MgF_2$ crystal bi-concave lens elements in series were used. In the lenses described here, the lens materials have a small and negative relative index of refraction, $n-n_o$, where n is the index of refraction and $n_o$ is the index of refraction of vacuum, nominally 1. Therefore the focusing elements are concave rather than the more familiar convex lens elements used for focusing light to wavelengths. The convex lens elements were symmetric, 25 mm in diameter d, with a radius R of 25 mm, an edge flat t of 0.5 mm, and a focal length $f_o$ of 150 m. The lens overall had a focal length of 5 m using a source of cold neutrons at 10 Angstroms. The lens elements in the demonstration system were abutting at edge flat t as shown.

Those skilled in the optics art understand that the lens used to demonstrate the invention was of a relatively simple construction and with optimization of the neutron optics substantially fewer focusing elements will be required. Moreover, the lens design for a commercial apparatus may have a variety of different kinds of lens elements, e.g. focusing and defocusing elements, to provide large aperture and reduce distortion and chromatic abberations. Lens elements with different neutron indices, both positive and negative, i.e. lens elements of different materials, may also be used, as tradeoffs between focus and chromatic abberation dictate. Distortion due to gravity is a well known effect in neutron optics, and an optimum lens design will account for gravity effects. Lenses which can be moved may also be used to make adaptive adjustments to the signal, as in modern telescope design. Because of these and other considerations, the number of lens elements in a commercial embodiment may vary over a wide range, e.g. 3–300 elements. The number of focusing elements would typically be within a smaller range, e.g. 3–30 elements.

Materials useful for the lens elements are low neutron absorption to materials, examples of which are given in the following Table. The materials are ranked by figure of merit (FOM) which is the ratio of bound coherent scattering length $b_o$, in units of femtometers (fm), to the absorption cross section $\sigma_a$, in units of barns (=100 $fm^2$), both measured for 2200 m/sec thermal neutrons. For isotopes, indicated by an asterisk (*), the FOM is multiplied by one-tenth the isotopic refinement, relative to natural abundance, required to achieve the stated cross section. For inclusion in the table, only nuclei with $b_c$>5 fm, $\sigma_a$ <0.1 barn, abundance >5% (for molecular weight or atomic weight (AW) >40) and FOM >10 are included. Materials with an incoherent scattering length $b_c$ greater in magnitude than 0.1 fm are also indicated with a plus symbol (+). These materials may be less suitable for use with polarized neutrons. The neutron refractive index n is derived from the bound coherent scattering cross section as $n-1=-(4\pi/2k^2)\rho b_c$ In this equation $k=2\pi/\lambda$, where $\lambda$ is the neutron wavelength, and $\rho$ is the density of atomic nuclei in the material.

TABLE

| element/ isotope | AW | $b_c$ | $\sigma_a$ | $bc/\sigma_a$ (FOM) |
|---|---|---|---|---|
| O | 15.99 | 5.8 | $1.9 \times 10^{-4}$ | $3.1 \times 10^4$ |
| C | 12.01 | 6.6 | $3.5 \times 10^{-3}$ | $1.9 \times 10^3$ |
| +Be | 9.01 | 7.8 | $7.6 \times 10^{-3}$ | $1.0 \times 10^3$ |
| *Pb | 208 | 9.5 | $4.8 \times 10^{-4}$ | $8.0 \times 10^2$ |
| +F | 18.99 | 5.6 | $9.6 \times 10^{-3}$ | $5.8 \times 10^2$ |
| *Zr | 90 | 6.4 | $1.1 \times 10^{-2}$ | $5.3 \times 10^2$ |
| *Pb | 206 | 9.2 | $3.0 \times 10^{-2}$ | $3.1 \times 10^2$ |
| +Bi | 208.98 | 8.5 | $3.4 \times 10^{-2}$ | $2.5 \times 10^2$ |
| *+H | 2 | 6.7 | $5.2 \times 10^{-4}$ | $2.1 \times 10^2$ |
| *Zr | 94 | 8.2 | $5.0 \times 10^{-2}$ | $1.6 \times 10^2$ |
| +Mg | 24.3 | 5.4 | $6.3 \times 10^{-2}$ | $8.6 \times 10^1$ |
| *Mo | 94 | 6.8 | $1.5 \times 10^{-2}$ | $8.5 \times 10^1$ |
| *Mo | 92 | 6.9 | $1.9 \times 10^{-2}$ | $6.8 \times 10^1$ |
| *Sr | 88 | 7.1 | $5.8 \times 10^{-2}$ | $4.3 \times 10^1$ |
| *+N | 15 | 6.4 | $2.4 \times 10^{-5}$ | $3.4 \times 10^1$ |
| *+Tl | 205 | 9.5 | $1.0 \times 10^{-1}$ | $2.4 \times 10^1$ |

As seen from the Table the figure of merit of these materials is dominated by absorption loss. For example, magnesium has a favorable index of refraction for neutrons, but is lossy, leading to a relatively modest FOM. Although $MgF_2$ was used to successfully demonstrate the invention, better choices can be selected from the above Table. Carbon can be used in the from of diamond or graphite. Combinations of carbon and oxygen can be used in the form of hydrocarbons, e.g. benzene crystals. Nitrogen and fluorine can be used in the form of hydrocarbons. Beryllium can be used in elemental form, or as an oxide or nitride. Fluorine can be used as $MgF_2$ as described above. Oxygen and nitrogen can be used as oxides or nitrides, e.g. MgO.

Crystalline materials are preferred due to their generally low diffuse scattering away from Bragg reflections. Nuclei with small incoherent scattering cross sections also exhibits low diffuse scattering, and appear especially suitable for systems employing polarized neutron sources.

As earlier pointed out, the negative refractive index for neutrons in the materials of the invention makes the focusing lens elements concave. This is an important advantage in an optical system dominated by absorption because the portion of the neutron beam that travels near the optical axis is least attenuated, and therefore consistent with the objective of focusing the beam. The flux profile at the focal plane of the lens is concentrated at the focal point as desired.

The materials in the Table are given by way of example. Many other materials may be used. Though not preferred, liquids can be used in thin walled glass or plastic lens shaped containers. Examples of such liquids are $H_2O$, alcohols, and acids such as HF, $H_2CO_3$.

Isotopes of these materials can also be used. For example, deuterated benzene has a relatively high figure of merit. It may also be possible to obtain enhanced properties by using nuclei with resonant cross sections for neutrons in the wavelength range 0.2–10 nm, e.g. 113 Cd.

The preferred materials for the invention are those in which cold neutron absorption, specified for the purpose of defining the invention as absorption of 10 Angstrom neutrons, is less than $10^{-1}$ barns, and the bound coherent scattering cross section for 2200 m/sec neutrons is >3 fm. The preferred materials can also be defined in terms of the figure of merit used in the Table above as those materials having a ratio of bound coherent scattering cross section to neutron absorption of more than $10^{31\ 1}$ $fm^{-1}$, and preferably more than 1 $fm^{-1}$, measured using 2200 m/sec neutrons.

Figure 2:
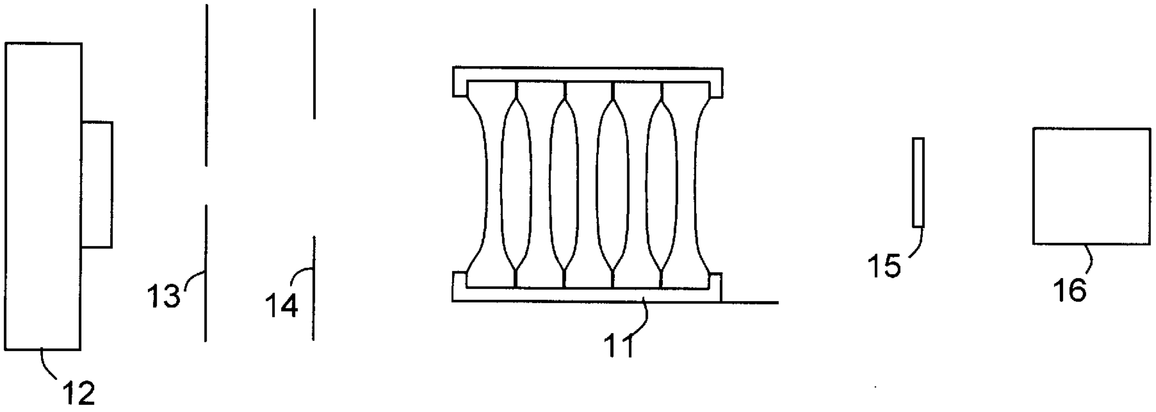
FIG. 2 is a schematic representation of a cold neutron focusing system employing the lens of FIG. 1.

A typical system employing the lens of FIG. 1 is shown in FIG. 2. Cold neutron source 12 is shown with pinhole 13, aperture 14, and lens array 11. The sample 15 may be positioned at the focal point as shown, or may be placed before the lens as known in the art. A device for detecting the scattered neutron beam is shown at 16. Except for the refractive lens 11, all these elements are standard in the art and are used in reflective systems, for example the Kumakhov lens systems referenced earlier.

The systems described are capable of focusing 10 Angstrom neutron beams to provide gains in excess of twenty relative to pinhole optics. Gain is defined as intensity in the focal spot compared with the intensity which would have been obtained without using a lens, i.e. using a collimating pinhole or slit. The objective of the invention is served if the gain produced by the refractive lens is at least 2.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. Apparatus for focusing cold neutrons comprising a source of a neutron beam the neutrons in said beam having a wavelength in the range 0.2–10 nm, focusing means for focusing said neutrons by refracting said neutron bean, said focusing means comprising a refractive lens, and said neutron beam source and said refractive lens arranged so that said neutron beam traverses through said refractive lens and is refracted thereby to focus said beam.

2. The apparatus of claim 1 in which the beam is focused to produce a gain of at least 2.

3. The apparatus of claim 2 in which the refractive lens comprises a material with a neutron absorption of less than $10^{-1}$ barns measured using 2200 m/sec neutrons.

4. The apparatus of claim 2 in which the refractive lens comprises a material with a bound coherent scattering cross section >3.0 fm measured using 2200 m/sec neutrons.

5. The apparatus of claim 2 in which the refractive lens comprises a material with a ratio of bound coherent scattering cross section to neutron absorption (cross section) of at least $10^{-1}$ measured using 2200 m/sec neutrons.

6. The apparatus of claim 1 in which the refractive lens comprises from 3–300 lens elements.

7. The apparatus of claim 6 in which the lens elements comprise focusing lens elements, and the focusing lens elements comprise concave lens elements.

8. The apparatus of claim 7 in which at least some of the focusing lens elements are bi-concave lens elements.

9. The apparatus of claim 6 in which the lens elements comprise cylindrical lens elements.

10. The apparatus of claim 6 in which the lens elements comprise defocusing lens elements and at least some of the defocusing lens elements are convex lens elements.

11. The apparatus of claim 6 in which one or more elemental constituents of the lens material are selected from the group consisting of O, N, H, C, Be, F, and Mg.

12. The apparatus of claim 6 in which the lens material of at least one of said lens elements comprises $MgF_2$.

13. The apparatus of claim 6 in which the lens elements are made from different materials with different neutron refractive indices.

14. The apparatus of claim 1 in which the neutrons in said beam comprise polarized neutrons.

15. The apparatus of claim 1 in which the neutrons in said beam are unpolarized neutrons.

16. The apparatus of claim 1 in which the source of neutrons is a continuous beam.

17. The apparatus of claim 1 in which the source of neutrons is a pulsed beam.

18. Apparatus for refracting cold neutrons comprising a source of a neutron beam the neutrons in said beam having a wavelength in the range 0.2–10 nm, refracting lens means for refracting said neutron beam, said neutron beam source and said refractive lens arranged so that said neutron beam traverses through said refractive lens and is refracted thereby to refract said beam.

19. The apparatus of claim 1 in which the beam is refracted to produce a gain greater than 1.

* * * * *